3,133,036
POLYURETHANE FIBERS CONTAINING A COLOR-
LESS LEUCO DERIVATIVE OF A BLUE-VIOLET
DYE
Arnoldus J. Ultee, Waynesboro, Va., assignor to E. I. du
Pont de Nemours and Company, Wilmington, Del., a
corporation of Delaware
No Drawing. Filed Nov. 7, 1960, Ser. No. 67,464
3 Claims. (Cl. 260—37)

This invention relates to essentially color-stable shaped articles prepared from polyurethane compositions which substantially retain their initial appearance when exposed to the oxidative action of nitric fumes or chlorine. More particularly, this invention relates to essentially white polyurethane filaments containing a small amount of the leuco derivative of a blue-violet dye.

It is well known in the textile art that undesirable yellowing of fibers may be offset to some extent by the incorporation of materials which appear blue to the eye in order to mask the complementary yellow color. For example, bluing agents have been incorporated into yarns and fabrics for this purpose. Although these materials may offset an initial yellow color and cause the fabric to appear white, they are not capable of compensating for an increase in the yellowness of the fabric, unless used in greater concentrations which cause the fabric initially to appear blue. As a further example, optical brighteners have been used for a similar purpose. These agents function by fluorescing with the emission of a blue wave length, thus masking the yellow color of the yarn or fabric. As with the bluing agents, the optical brighteners often cause the material to display an original blue tint and are otherwise incapable of compensating for any increase in yellow color. Moreover, since the optical brighteners require a source of ultra-violet light, they are often ineffective under artificial light. Furthermore, optical brighteners are frequently undesirable in that they sometimes catalyze the photoyellowing of the yarn or fabric.

It is, therefore, an object of this invention to provide essentially color-stable polyurethane shaped articles in which no apparent yellowness develops on the gradual exposure to nitric fumes or chlorine. A further object is to provide a spandex fiber which does not discolor from the oxidative action of nitric fumes or chlorine, and in which photoyellowing is minimized. A still further object is to provide a process for masking the yellowing of polyurethane compositions so that an essentially constant state of color is achieved.

The term "spandex fiber" is used herein in its generic sense as defined by the "Textile Fibers Products Indentification Act" to mean a manufactured fiber in which the fiber-forming substance is a long-chain synthetic elastomer comprised of at least 85% of a segmented polyurethane.

These and other objects are accomplished by providing shaped articles comprising a segmented polyurethane elastomer containing recurring urethane linkages of the formula

—O—CO—NH— and an essentially colorless leuco derivative of a blue-violet dye, said leuco derivative being convertible to said dye by the oxidative action of nitric fumes or chlorine, said leuco derivative being present in an amount sufficient to mask yellowing by said oxidative action but in an amount less than 500 parts per million based on the segmented polyurethane.

The above-described articles are obtained by incorporating a small amount of a colorless leuco derivative of a blue-violet dye which develops its color when exposed to nitric fumes or chlorine.

By incorporating the colorless precursors of such dyes in segmented polyurethanes, colored dyes are produced simultaneously with the yellowing of the polymer which is believed to be caused by the action of acid fumes, chlorine, and light. By proper choice of shade and concentration, the dyes are thereby caused to mask the increasing yellowness in the polymer by gradually generating the complementary blue-violet shade.

The polyurethanes to which this invention is applicable contain the recurring linkage —O—CO—NH—, and particularly those in which the urethane nitrogen is joined to an aromatic radical. The segmented polyurethanes may also contain the ureylene linkage

—NH—CO—NH—

For many applications a particularly advantageous polymeric structure comprises the aromatic ureylene radical, i.e., —Ar—NH—CO—NH wherein Ar represents an aromatic nucleus. Such polymers are especially advantageous because elastomers based on them display excellent elongation and tensile properties. However, elastomers containing this preferred linkage appear to be most susceptible to the degradative action of chlorine and acid fumes.

The segmented polyurethanes are generally prepared from hydroxyl-terminated "prepolymers," such as hydroxyl-terminated polyethers and polyesters of low molecular weight. Reaction of the prepolymer with a molar excess of organic diisocyanate, preferably an aromatic diisocyante, produces an isocyanate-terminated material which may then be "chain-extended" with a difunctional, active-hydrogen containing compound, such as water, hydrazine, organic diamines, glycols, aminoalcohols, etc. Many segmented polyurethanes of this type are described in several patents and are useful in the practice of this invention. Among these are U.S. Patents 2,929,800, 2,929,801, 2,929,802, 2,929,804, 2,957,852, and U.S. Re. 24,689.

A particularly useful application of this invention is in the field of elastic filaments. It is known that elastic filaments may be made from segmented polyurethanes which contain segments of a high-melting, crystalline polymer alternating in the chain with segments of a low-melting, amorphous polymer. The crystalline, high-melting segment may be derived from, for example, a polyurea, polyurethane, polyamide, or bis-ureylene polymer. The low-melting, amorphous segment may be derived from, for example, a polyester, a polyether, or an N-alkylated polyurethane. Polymers of the spandex type are illustrative of such segmented polyurethanes. As taught by the aforementioned patents, many of the segmented polyurethanes when in filament form display elongations at the break in excess of 200%, elastic recovery (or tensile recovery) of above about 90%, and stress decay of below about 20%.

The leuco derivatives of dyes useful in the present invention are essentially colorless in the leuco form but are convertible to a violet-blue dye by the oxidative action of nitric fumes or chlorine. Many of these leuco derivatives when incorporated in a polyurethane are stable to air oxidation. Those which are not substantially stable to air oxidation may be stabilized by treatment with a small quantity of a quaternary nitrogenous base, as taught in U.S. Patent 2,755,202, or by esterification or acylation, in known manner. Selected dyes from the following classes have been found to be suitable for the practice of this invention: triarylmethane, azine, oxazine, dioxazine, indigo, thioindigo, thiazine. Dyes of the azo, nitro, and nitroso classes are not suitable because the reduced form does not revert to the dye by the oxidative action of nitric fumes or chlorine. The anthraquinone dyes are also unsuitable because the reduced forms are not essentially colorless. Examples of suitable dyes include the following:

Crystal violet,
Ethyl violet,
Other N-polyalkyl-tris(p-aminophenyl)methanes, 4,4'-diamino - 4" - methoxy - 3,6,3',6' - tetraethyltriphenylmethane,
Victoria Pure Blue BO (Color Index 42595),
Methylene blue,
Indigo,
Substituted indigo or thioindigo derivatives, such as 7,7'-dimethyl-5,6,5',6'-tetrachlorothioindigo,
Blue dye of Example 1 of U.S.P. 2,336,520,
"Pontacyl" Wool Blue Bl (Color Index 50315), and
"Chromazol" Violet 2BHS (Color Index 51055).

As described hereinabove, the dye precursor or leuco derivative is used in the practice of this invention at a concentration so selected that the rate of color generation approximates the rate at which the yellow color develops in the particular segmented polyurethane with which it is used. Since the rate of yellowing varies considerably with the polymeric structure of the polyurethane, a particular concentration of dye precursor effective under all conditions cannot be specified. Moreover, there is a wide variation not only in the rate of yellowing of various polyurethanes, but also in the purity of commercial dyes, in their tinctorial value, and in the rate of conversion to the colored form. In the case of certain triphenylmethane dye precursors applied to some spandex fibers, I find that as little as ten parts per million produces a beneficial effect in accordance with this invention. On the other hand, as much as about 500 parts per million of certain vat dyes are required to mask the color generated in a polyurethane having high susceptibility to yellowing. For ordinary dyeing of fibers, of course, a much higher concentration of dye is normally used, even for the production of pastel shades. In any event, the leuco derivative is used in sufficiently small concentrations that no color is apparent in the treated polyurethane when conversion to the color form of the dye is accomplished.

Small amounts of the aforementioned leuco derivatives may be used in conjunction with ordinary dyes for achieving a polyurethane composition which, although not colorless, retains a generally constant color on gradual exposure to nitric fumes or chlorine.

The leuco derivatives may be added to the segmented polyurethanes to produce the compositions of this invention by any convenient method of mixing in the same way that other additives are generally compounded into polyurethanes. The leuco derivatives may be added before or during the formation of the polyurethane, for example, before chain-extension of the isocyanate-terminated prepolymer. When, however, the polyurethane is to be utilized in solution, it is convenient to add the leuco derivative to the polymer solution, such as by dissolving the dye precursor in a small amount of N,N-dimethylformamide, or the like, and mixing with the polymer solution.

The following examples illustrate the preferred embodiments of the invention and show the range of concentrations of various leuco bases which are effective in masking the yellowing produced in segmented polyurethanes. The fume-fading tests are made in a chamber similar to that described in the Technical Manual and Yearbook of the American Association of Textile Chemists and Colorists, volume 32 (1956), pages 90–91. The combustion fumes supplied to the cabinet are generated by a Meker laboratory burner supplied with gas at the rate of 2.0 cubic feet per hour. The temperature of the chamber is held at 65° C.

The chlorine tests are made by immersing the samples in dilute sodium hypochorite solutions and measuring the resulting degree of yellowness. To simulate exposure to chlorinated swimming pool water, the concentration of active chlorine is adjusted to 5 parts per million, and the samples are exposed four hours at room temperature. To simulate bleaching conditions, the samples are exposed 20 minutes at 65° C. to a concentration of 200 parts per million active chlorine. The exposed samples are air dried at room temperature.

The "percent yellow" is measured on a colorimeter. It is given by the expression:

$$\text{Percent yellow} = 100 - 100\left(\frac{B}{R+G+B}\right)\bigg/\left(\frac{B_s}{R_s+G_s+B_s}\right)$$

where B, R, and G represent the colorimeter readings for light reflected from a yarn sample and filtered respectively through blue, red, and green filters. $B_s$, $R_s$, and $G_s$ are the corresponding values for a standard white reference plate used to zero the instrument. At about 16%, the yellow is conspicuous to the eye.

This invention will be further illustrated, but is not intended to be limited by, the following examples in which parts are by weight unless otherwise specified. The segmented polyurethane elastomer in the examples is prepared as follows:

Ninety-two (92) parts of polytetramethylene ether glycol (0.092 mol) of approximately 1000 molecular weight is reacted with 8 parts of 2,4-tolylene diisocyanate (0.046 mol) under an atmosphere of nitrogen for three hours at 80° C. The product of this reaction (40 parts), having terminal hydroxyl groups, is reacted with 10 parts of p,p'-methylene diphenyl diisocyanate for one hour at 80° C. The polymeric macrointermediate, having terminal isocyanate groups, is diluted with 25 parts of N,N-dimethylformamide. Fifteen (15) parts of this solution is chain-extended by addition to 0.165 part of hydrazine hydrate in 30 parts of dimethylformamide. The resulting solution of elastomeric polymer contains approximately 19–20% solids, and has a viscosity of 400 to 500 poises at 30° C. To this solution are added a slurry of titanium dioxide in dimethylformamide and a solution of poly(N,N-diethyl-beta-aminoethyl methacrylate) in dimethylformamide such that the final mixture contains 5% of each additive based on the elastomeric solids.

EXAMPLE I

A solution of 20 mg. stabilized leuco ethyl violet in 50 ml. dimethylformamide is stirred for one hour with 4000 grams of a spinning solution containing 19% of the segmented polyurethane elastomer dissolved in dimethylformamide. The modified solution is spun into a 300-denier yarn containing 26 parts per million leuco ethyl violet. Other yarns are prepared containing 0, 13, 26, and 52 parts per million leuco ethyl violet. The yarns are wound on cards and the percent yellowness is determined before and after 16 hours' exposure to combustion fumes. The results are set forth in Table 1 which follows:

Table 1

| Leuco ethyl violet in yarn, parts per million | Percent Yellowness | |
|---|---|---|
| | Before fume exposure | After fume exposure |
| 0 | 3.5 | 14.6 |
| 13 | 1.8 | 5.8 |
| 26 | 1.4 | 1.4 |
| 52 | 0.6 | 0 |

EXAMPLE II

By the procedure of Example I, yarns are prepared containing the following dye precursors:

Leuco crystal violet,
Leuco 4-dimethylamino-4'4"-bisdiethylamino-triphenylmethane,
Leuco 4-diethylamino-4'4"-bisdimethylamino-triphenylmethane, Leuco 4,4'-diamino-4''-methoxy-3,6,3',6'-tetraethyl-triphenylmethane.

Each of these additives in amounts of 25 to 50 parts per million reduces the fume discoloration of the unmodified spandex yarn from 15% to 5-7% yellowness.

EXAMPLE III

Yarns are modified by the procedure of Example I with the following dye precursors:

(A) 50 parts per million leuco ethyl violet,
(B) 50 parts per million 4,4'-diamino-4''-methoxy-3,6, 3',6'-tetraethyl-triphenylmethane.

Yarn A is treated four hours with a sodium hypochlorite solution, containing 5 parts per million active chlorine, at room temperature, and its yellowness compared with that of a similarly treated unmodified yarn. The results are as follows:

*Table 2*

| Leuco ethyl violet in yarn, parts per million | Percent Yellowness | |
|---|---|---|
| | Before chlorine exposure | After chlorine exposure |
| 0 | 3.5 | 5.4 |
| 50 | −0.6 | −1.1 |

Yarn B is treated for twenty minutes at 65° C with a sodium hypochlorite solution containing 500 parts per million active chlorine, with the following results:

*Table 3*

| Dye Precursor | Percent Yellowness | |
|---|---|---|
| | Before chlorine exposure | After chlorine exposure |
| None (Control) | 3.5 | 32.2 |
| Leuco 4,4'-diamino-4''-methoxy-2, 6, 3', 6'-tetraethyl-triphenylmethane | 1.2 | 20.3 |

As illustrated in the examples, by incorporating the leuco derivative of a blue-violet dye in the polyurethane polymer, the shaped articles prepared therefrom substantially retain their initial appearance. Although the specific examples illustrate the preparation of textile filaments and yarns, other shaped articles such as films and molded articles may be prepared from the modified polyurethanes by known procedures.

The primary advantage accruing from the present invention is the achievement of a polyurethane composition that remains free from appreciable yellowing on exposure to nitric fumes and chlorine. In contrast to the use of bluing agents or optical brighteners, the process of this invention does not affect the original color of the polyurethane composition. By the practice of this invention, one is able to compensate for a considerable range of degrees of yellowness. This invention has the additional advantage over optical brighteners in that it is effective in artificial light as well as in daylight. Moreover, although the invention is directed principally to protection against discoloration from acid fumes and chlorine, a partial compensation of yellowing due to ultraviolet light is also obtained.

The polyurethane compositions modified according to the present invention are useful in all applications wherever color is important and the product is subject to exposure to acid fumes and/or chlorine. In the textile field, this includes the use of spandex yarns in white fabrics and in garments constructed of uncovered spandex. Bathing suits for wear in chlorine-treated swimming pools and foundation garments which may be subjected to drying in gas-heated dryers are exemplary of the uses to which this invention may be put.

Good wash fastness of spandex fibers treated according to this invention is observed. It has been found that modification of spandex according to the present invention yields a product which is stable to all normal spandex finishing treatments and to most consumer treatments. The modification survives washing with perborates, exposure to chlorine in swimming pool concentrations, and is stable to a normal solvent scour.

As many widely different embodiments of this invention may be made without departing from the spirit and scope thereof, it is to be understood that this invention is not to be limited to the specific embodiments thereof except as defined in the appended claims.

I claim:

1. An essentially white manufactured fiber in which the fiber-forming substance is a long-chain synthetic elastomer comprised of at least 85% of a segmented polyurethane, said polyurethane having in admixture therewith an essentially colorless leuco derivative of a blue-violet dye which is convertible to said dye by oxidative action, said derivative being present in said polyurethane in an amount sufficient to maintain the essentially white color of said fiber and mask yellowing of said polyurethane by said oxidative action, said amount being from about 10 to less than 500 parts per million based on said polyurethane.

2. The fiber of claim 1 wherein said polyurethane contains aromatic ureylene radicals of the formula

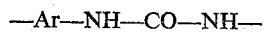

—Ar—NH—CO—NH— wherein Ar represents an aromatic nucleus.

3. The fiber of claim 2 wherein said polyurethane is prepared by chain-extending an isocyanate-terminated polymeric macrointermediate with hydrazine.

References Cited in the file of this patent
UNITED STATES PATENTS

| | | |
|---|---|---|
| 2,090,511 | Crossley et al. | Aug. 17, 1937 |
| 2,336,520 | Zwilgmeyer | Dec. 14, 1943 |
| 2,382,188 | Vincent et al. | Aug. 14, 1945 |
| 2,929,800 | Hill | Mar. 22, 1960 |
| 2,957,852 | Frankenburg et al. | Oct. 25, 1960 |
| 3,022,298 | Mory et al. | Feb. 20, 1962 |

OTHER REFERENCES

Application of Dyestuffs (Matthews), published by Wiley and Sons, New York, 1920, page 114.

Hackh: "Chemical Dictionary" (3rd edition), published by the Blakiston Co., 1944, page 488.